(12) United States Patent
Jin et al.

(10) Patent No.: US 10,613,718 B2
(45) Date of Patent: Apr. 7, 2020

(54) SCREEN DISPLAY METHOD FOR MOBILE TERMINAL

(71) Applicant: Samsung Electronics Co., Ltd, Gyeonggi-do (KR)

(72) Inventors: Sang Hoon Jin, Gyeonggi-do (KR); Su Yeul Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 14/160,286

(22) Filed: Jan. 21, 2014

(65) Prior Publication Data

US 2014/0137037 A1 May 15, 2014

Related U.S. Application Data

(63) Continuation of application No. 12/070,877, filed on Feb. 21, 2008, now Pat. No. 8,633,900.

(30) Foreign Application Priority Data

Feb. 22, 2007 (KR) .......................... 10-2007-0017692

(51) Int. Cl.
*G06F 3/0484* (2013.01)
*G06F 3/0482* (2013.01)
(Continued)

(52) U.S. Cl.
CPC ........ *G06F 3/04842* (2013.01); *G06F 3/0482* (2013.01); *G06F 3/04883* (2013.01);
(Continued)

(58) Field of Classification Search
CPC .............. G06F 3/04842; G06F 3/0482; G06F 3/04883; G06F 17/30873;
(Continued)

(56) References Cited

U.S. PATENT DOCUMENTS 4,862,389 A * 8/1989 Takagi ................. G06F 3/0481
715/794
5,438,661 A * 8/1995 Ogawa ................. G06F 3/0481
715/259

(Continued)

FOREIGN PATENT DOCUMENTS

| JP | 2003-209609 | 7/2003 |
| JP | 2006-236355 | 9/2006 |
| KR | 10-2003-0088374 | 11/2003 |

*Primary Examiner* — Amare Mengistu
*Assistant Examiner* — Jennifer L Zubajlo

(57) ABSTRACT

A content display method for a mobile terminal is disclosed. The mobile terminal includes at least two hierarchical structures each having at least two contents at a level. The content display method includes: displaying, in response to selection of a content, a window associated with the selected content; displaying, in response to input of a multi-window display request, windows associated with contents at the same level as the selected content together on a single screen; and rearranging, in response to input of a window movement request, the content windows by window movement to display the rearranged content windows together on a single screen. As a result, same-level contents or application windows in execution can be displayed together on a single screen according to a user request. Hence, the user can readily transition between contents or applications with enhanced user convenience.

18 Claims, 21 Drawing Sheets

(51) Int. Cl.
*G06F 3/0488* (2013.01)
*G06F 16/954* (2019.01)
*H04M 1/725* (2006.01)

(52) U.S. Cl.
CPC .. *G06F 16/954* (2019.01); *G06F 2203/04804* (2013.01); *H04M 1/72583* (2013.01); *H04M 2250/22* (2013.01)

(58) Field of Classification Search
CPC .... G06F 2203/04804; H04M 1/72583; H04M 2250/22
See application file for complete search history.

(56) References Cited

U.S. PATENT DOCUMENTS

| | | | | |
|---|---|---|---|---|
| 5,694,561 A * | 12/1997 | Malamud | G06F 3/0481 | 715/805 |
| 6,108,714 A * | 8/2000 | Kumagai | G06F 9/45512 | 715/804 |
| 6,215,490 B1 * | 4/2001 | Kaply | G06F 3/0481 | 715/788 |
| 6,609,146 B1 * | 8/2003 | Slotznick | G06F 9/4843 | 709/200 |
| 6,690,390 B1 * | 2/2004 | Walters | G06F 3/04895 | 715/705 |
| 7,302,648 B1 * | 11/2007 | Brunner | G06F 9/451 | 715/788 |
| 7,429,993 B2 * | 9/2008 | Hui | G06F 3/0481 | 345/592 |
| 7,676,761 B2 * | 3/2010 | Oliver | G06F 9/542 | 715/803 |
| 9,668,024 B2 * | 5/2017 | Os | G10L 15/22 | |
| 2001/0003186 A1 * | 6/2001 | DeStefano | G06F 17/30988 | 715/234 |
| 2001/0056434 A1 * | 12/2001 | Kaplan | G06F 17/30017 | |
| 2002/0078447 A1 * | 6/2002 | Mizutome | H04N 5/4401 | 725/37 |
| 2003/0001899 A1 * | 1/2003 | Partanen | G06F 3/0481 | 715/800 |
| 2003/0030675 A1 * | 2/2003 | Ku | G06F 3/048 | 715/788 |
| 2003/0229900 A1 * | 12/2003 | Reisman | G06F 16/954 | 725/87 |
| 2004/0070629 A1 * | 4/2004 | Seifert | G06F 3/0482 | 715/810 |
| 2004/0100479 A1 * | 5/2004 | Nakano | G06F 1/1626 | 715/700 |
| 2006/0090141 A1 * | 4/2006 | Loui | G06F 17/30064 | 715/764 |
| 2006/0129949 A1 * | 6/2006 | Wu | G06F 3/0481 | 715/804 |
| 2006/0187204 A1 * | 8/2006 | Yi | G06F 1/1626 | 345/158 |
| 2006/0200779 A1 * | 9/2006 | Taylor | G06F 3/0481 | 715/781 |
| 2006/0238515 A1 * | 10/2006 | Ohshita | G06F 3/0481 | 345/173 |
| 2006/0242164 A1 * | 10/2006 | Evans | G06F 16/168 | |
| 2007/0109323 A1 * | 5/2007 | Nakashima | G01C 21/3664 | 345/661 |
| 2007/0214429 A1 * | 9/2007 | Lyudovyk | G06F 3/048 | 715/772 |
| 2007/0247435 A1 * | 10/2007 | Benko | G06F 3/0488 | 345/173 |
| 2008/0009325 A1 * | 1/2008 | Zinn | H04M 1/72563 | 455/566 |
| 2008/0178126 A1 * | 7/2008 | Beeck | G06F 3/017 | 715/863 |
| 2009/0288036 A1 * | 11/2009 | Osawa | G06F 9/451 | 715/794 |
| 2009/0309897 A1 * | 12/2009 | Morita | H04M 1/2535 | 345/629 |
| 2010/0271401 A1 * | 10/2010 | Fong | G06F 3/0485 | 345/660 |

* cited by examiner

| AAA | BBB |
|---|---|
| 1. AAA1 | BBB1 |
| 2. AAA2 | BBB2 |
| 3. AAA3 | BBB3 |
| 4. AAA4 | BBB4 |
| 5. AAA5 | BBB5 |
| CCC | DDD |
| CCC1 | DDD1 |
| CCC2 | DDD2 |
| CCC3 | DDD3 |
| CCC4 | DDD4 |
| CCC5 | DDD5 |

SCREEN DISPLAY METHOD FOR MOBILE TERMINAL

CROSS-REFERENCE TO RELATED APPLICATION(S) AND CLAIM OF PRIORITY

This application is a continuation of U.S. patent application Ser. No. 12/070,877, filed Feb. 21, 2008, entitled "SCREEN DISPLAY METHOD FOR MOBILE TERMINAL", which claims the benefit under 35 U.S.C. § 119(a) to a Korean patent application filed in the Korean Intellectual Property Office on Feb. 22, 2007, and assigned Serial No. 10-2007-0017692, the entire disclosure of which is hereby incorporated by reference.

TECHNICAL FIELD OF THE INVENTION

The present invention relates generally to a mobile terminal and, more particularly, to a screen display method for a mobile terminal wherein a plurality of contents belonging to the same level or a plurality of applications in execution can be displayed together on a single screen in response to user inputs.

BACKGROUND OF THE INVENTION

A mobile phone, MP3 player, personal digital assistant, portable multimedia player, digital camera and notebook are examples of mobile terminals. Such a mobile terminal has a display unit including, for example, liquid crystal display devices to display various contents to the user. The user viewing the screen can select and execute a desired function through manipulation of a touch pad or key buttons.

Normally, contents are categorized and organized in a hierarchical structure to facilitate selection and management. Contents at a particular level can be accessed through upper level categories.

However, in a hierarchical structure of contents, during playback of a content, the user may have to navigate the levels one by one through the hierarchical structure to select another content.

The mobile terminal also provides various applications (programs) such as a phonebook, note pad, calculator, scheduler, and remote control. The user may desire to simultaneously execute multiple applications and activate them one after the other.

However, only a window associated with a selected and activated application is displayed on the screen, and windows associated with other applications are hidden from the screen. To transition from the activated application to another application, the user may have to close or reduce the window associated with the activated application and then find a target application. In particular, if the target application is the last one, the user is inconvenienced by having to close or reduce those windows associated with applications arranged between the activated application and the target application.

SUMMARY OF THE INVENTION

To address the above-discussed deficiencies of the prior art, it is a primary object to provide a screen display method for a mobile terminal that enables easy transitions between contents.

The present invention also provides a screen display method for a mobile terminal wherein a plurality of contents belonging to the same level can be simultaneously displayed on the screen.

The present invention further provides a screen display method for a mobile terminal that enables easy transitions between applications in execution.

The present invention further provides a screen display method for a mobile terminal wherein a plurality of applications in execution can be simultaneously displayed on the screen.

In accordance with an exemplary embodiment of the present invention, there is provided a content display method for a mobile terminal using at least two hierarchical structures each having at least two contents at a level, including: displaying, in response to selection of a content, a window associated with the selected content; displaying, in response to input of a multi-window display request, windows associated with contents at the same level as the selected content together on a single screen; and rearranging, in response to input of a window movement request, the content windows by window movement to display the rearranged content windows together on a single screen.

In accordance with another exemplary embodiment of the present invention, there is provided a content display method for a mobile terminal having a motion sensor and touch screen, using at least two hierarchical structures each having at least two contents at a level, including: detecting, during display of a window associated with a selected content, a user action through the motion sensor; displaying, if a user action is detected, windows associated with contents at the same level as the selected content together in a form of a stack on a single screen; and rearranging the content windows by window movement through a touch to the touch screen to display the rearranged content windows together on a single screen.

In accordance with another exemplary embodiment of the present invention, there is provided an application display method for a mobile terminal, including: displaying, in response to selection of an application during execution of multiple applications, a window associated with the selected application; displaying, in response to input of a multi-window display request, windows associated with the applications in execution together on a single screen; and rearranging, in response to input of a window movement request, the application windows by window movement to display the rearranged application windows together on a single screen.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

In the description, the term "content" refers to multimedia data such as a song, photograph, moving image, game, document, or data file. Contents may include items or category information for classification. Contents are displayed as windows on a display unit of the mobile terminal. The term "descriptive listing" refers to information on contents. Content information includes a character, image, number, symbol, or combination thereof, and may denote the name, image, or category of an associated content. For example, the descriptive listing of a music content can include an artist name, song title, and album jacket image. The term "application" refers to a program that is written to implement one of specific functions of the mobile terminal, such as a phonebook, note pad, calculator, scheduler, and remote control.

For the purpose of description, a mobile communication terminal is described as an example of a mobile terminal of the present invention. However the present invention is not limited to a mobile communication terminal. The mobile terminal of the present invention is a terminal for user convenience, and may be any information and communication appliance or multimedia appliance, such as a mobile communication terminal, mobile phone, wired/wireless phone, personal digital assistant (PDA), smart phone, audio player, MP3 player, notebook, or personal computer.

Figure 1:
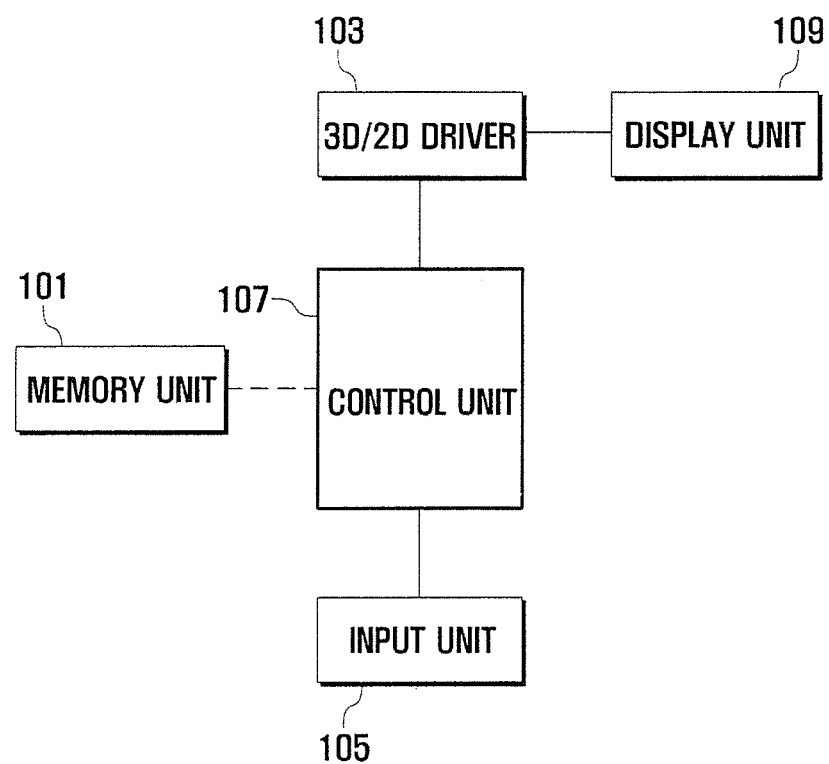
FIG. 1 is a schematic block diagram illustrating a mobile terminal to display contents and applications in accordance with the principles of the present invention.

FIG. 1 is a schematic block diagram illustrating a mobile terminal to display contents and applications in accordance with the principles of the present invention.

Referring to FIG. 1, the mobile terminal includes a memory unit 101, 3D/2D driver 103, input unit 105, control unit 107, and display unit 109.

The memory unit 101 may include a program storage section and a data storage section. In particular, the memory unit 101 includes at least two hierarchical structures having a plurality of contents. In response to a multi-window display request by the user during display of a content, the memory unit 101 arranges contents that are at the same level as the displayed content in the form of an opaque stack, transparent stack, tile board, or folding fan, and temporarily stores the arranged contents.

In addition, the memory unit 101 may be an internally or externally installable unit. The memory unit 101 may also be a server (for example, a content server) delivering data to the mobile terminal through a wired or wireless connection. In this case, the mobile terminal further includes a transceiver section for communication with the server.

The 3D/2D driver 103 enables the display unit 109 to display contents as three or two-dimensional images to the user. In humans, left and right eyes are horizontally separated by about 65 mm, thereby causing binocular disparity, which is known as the most important factor of three-dimensional effects. That is, the left and right eyes send different two-dimensional images of an object through the retina to the brain. The brain then fuses the two-dimensional images together into a three-dimensional image of the original object, and produces depth and reality information. Using this principle, the 3D/2D driver 103 enables display of contents as three or two-dimensional images.

The input unit 105 inputs a signal for manipulation of the mobile terminal from the user. In particular, the input unit 105 inputs user signals related to content search and selection, display of contents at the same level, movement of one or more windows, and scrolling. If the display unit 109 (described later) has touch-screen capabilities, it can act as an input unit.

The input unit 105 can include any of a key pad having a plurality of key buttons, touch panel for converting a touch event into an input signal, pointing device such as an optical mouse, jog dial in the form of a rotation dial, touch wheel for converting a touch and rotation into an input signal, scroll wheel for converting a rotation action into an input signal, and the like.

The control unit 107 controls the overall operation of the mobile terminal. In particular, the control unit 107 controls display of contents. During content display, in response to a multi-window display request, the control unit 107 controls the display unit 109 to display those contents at the same level as the currently displayed content in the form of an opaque stack, transparent stack, tile board, or folding fan. When multiple windows are displayed, the control unit 107 controls the display unit 109 to reduce window sizes. The control unit 107 controls the display unit 109 to display abridged content information in windows other than the front window. That is, some information such as the numbers of descriptive listings may be omitted from display.

In response to a request for single window movement or multiple window movement during display of windows associated with same-level contents, the control unit 107 controls the display unit 109 to rearrange the windows accordingly. In response to a scrolling request during display of same-level content windows, the control unit 107 controls the display unit 109 to scroll the front one or all of the windows depending upon settings by the user.

The control unit 107 can recognize a multi-window display request from the input unit 105 in various manners according to the configuration of the mobile terminal. For example, if a motion sensor is equipped, the control unit 107 recognizes shaking of the mobile terminal by the user as a multi-window display request. If the display unit 109 has a touch-screen capability, the control unit 107 recognizes dragging on the lower end of the display unit 109 as a multi-window display request. If a touch wheel or scroll wheel is equipped, the control unit 107 recognizes pressing of the wheel center as a multi-window display request. The control unit 107 may also recognize a multi-window display request by other means. In response to a multi-window display request, the control unit 107 can display inactive content windows without some descriptive listings in order to effectively display multiple content windows within the limited display space of the display unit 109.

The control unit 107 can recognize a single window movement request from the input unit 105 in various manners according to the configuration of the mobile terminal. For example, the control unit 107 recognizes turning of the mobile terminal perpendicularly to the ground, touching of the front window on the display unit 109, or a small amount of wheel rotation, as a single window movement request. The control unit 107 may also recognize a single window movement request by other means.

The control unit 107 can recognize a multiple window movement request from the input unit 105 in various manners according to the configuration of the mobile terminal. For example, the control unit 107 recognizes turning of the mobile terminal parallel with the ground, dragging from the front window to the last window on the display unit 109, or a large amount of wheel rotation, as a multiple window movement request. The control unit 107 may also recognize a multiple window movement request by other means.

The control unit 107 can recognize a scrolling request from the input unit 105. For example, the control unit 107 recognizes touching of a scroll bar on the display unit 109 as a scrolling request, which causes scrolling of the front one or all of the content windows. The control unit 107 may also recognize a scrolling request by other means.

The display unit 109 displays data from the control unit 107. The display unit 109 may include a panel of liquid crystal display (LCD) devices, LCD controller, and memory device for storing image data to be displayed. If the panel has a touch screen capability, the display unit 109 can also act as an input means.

In response to selection of a content, the display unit 109 displays the selected content and associated descriptive listing. The content may be a song, photograph, moving image, game, document, or data file. The descriptive listing is information on the content, and may denote the name, image, or category of the associated content.

In response to a multi-window display request during content display, the display unit 109 displays requested contents in an arrangement described before. In response to a single or multiple window movement request, the display unit 109 moves content windows to display the rearranged content windows. In response to a scrolling request, the display unit 109 scrolls one or more content windows according to preset settings.

The display unit 109 can display abridged content information in content windows other than the front window. When multiple content windows are displayed, the display unit 109 displays a full descriptive listing in the front (active) content window, and displays partial descriptive listings in the remaining inactive content windows. That is, the display unit 109 can display only representative information such as images or categories for contents in inactive content windows.

Figure 2:
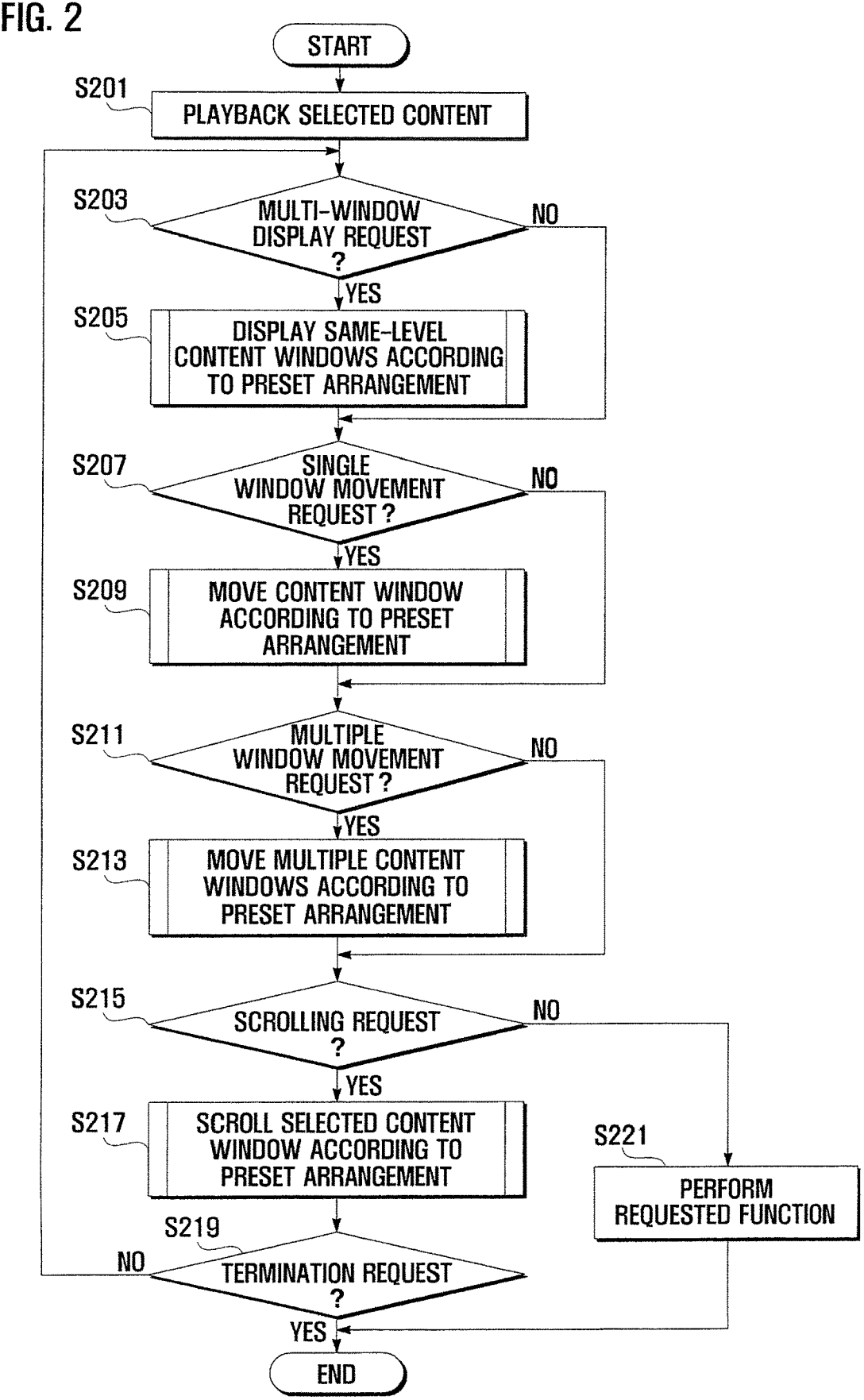
FIG. 2 is a flow chart illustrating a content display method according to an exemplary embodiment of the present invention.
Figure 3:
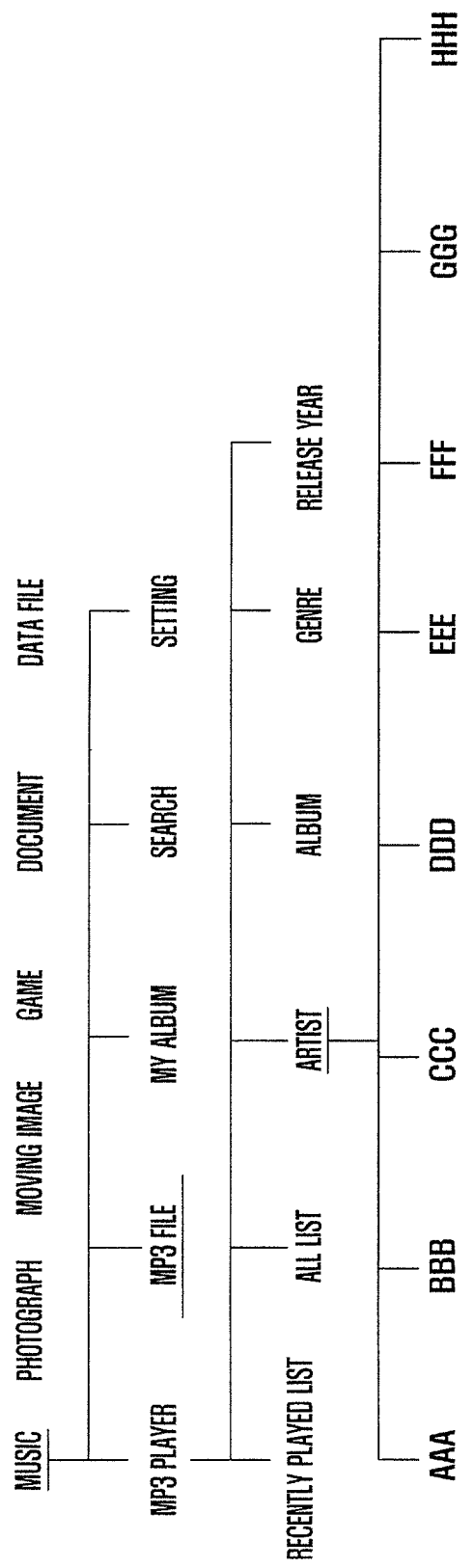
FIG. 3 is a diagram illustrating a hierarchical structure of contents.
Figure 4:
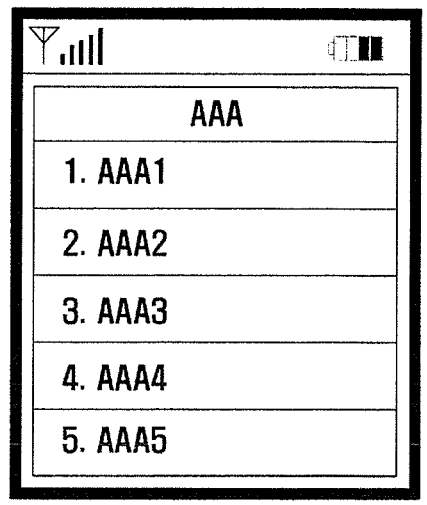
FIG. 4 is a screen representation of a content window.

Hereinafter, a content display method of the present invention is described. FIG. 2 is a flow chart illustrating a content display method according to an exemplary embodiment of the present invention. FIG. 3 is a diagram illustrating a hierarchical structure of contents. FIG. 4 is a screen representation of a content window.

Referring to FIG. 2, upon selection of a content, the control unit 107 of the mobile terminal plays back the selected content (S201). Music contents are used to describe the present method. Music contents are managed using a hierarchical structure illustrated in FIG. 3, where top-level items are 'music', 'photograph', 'moving image', 'game', 'document', and 'data file'. The 'music' item has lower-level items 'Mp3 player', 'Mp3 file', 'my album', 'search' and 'setting'. The 'Mp3 file' item has lower-level items 'recently-played list', 'all list', 'artist', 'album', 'genre' and 'release year'. The 'artist' item has lower-level items AAA, BBB, CCC, DDD, EEE, FFF, GGG and HHH. That is, the structure of FIG. 3 has three levels, and each level has five to eight lower-level items. FIG. 4 corresponds to a state where the artist 'AAA' is selected and songs released by the artist 'AAA' are listed. That is, the control unit 107 recognizes selection of the artist 'AAA', and displays a descriptive listing of the selected artist 'AAA' on the display unit 109.

The control unit 107 checks whether a multi-window display request is input from the user during display of the selected content window (S203).

Figure 5A:
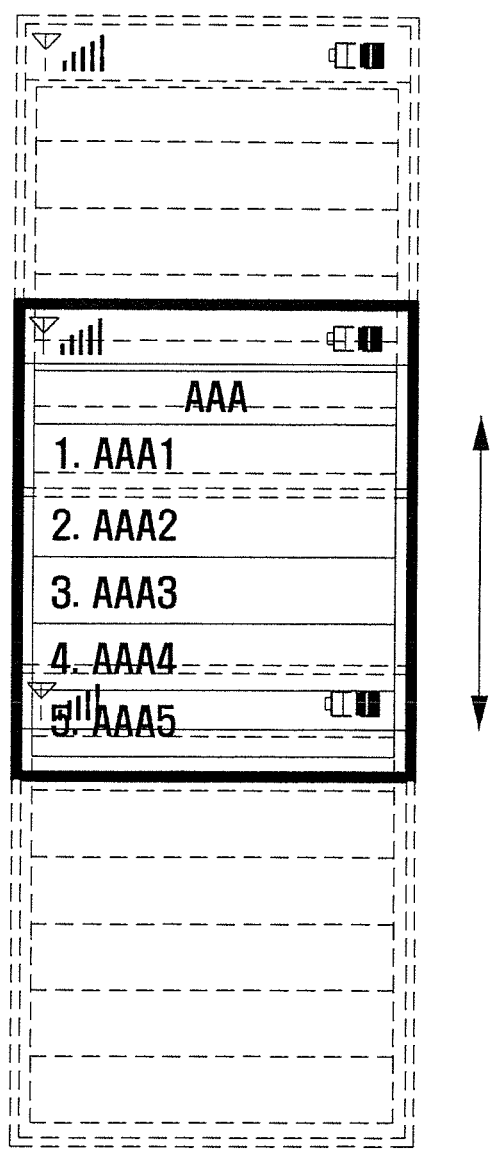
FIGS. 5A to 5C illustrate window manipulation by a user for content window display.
Figure 5B:
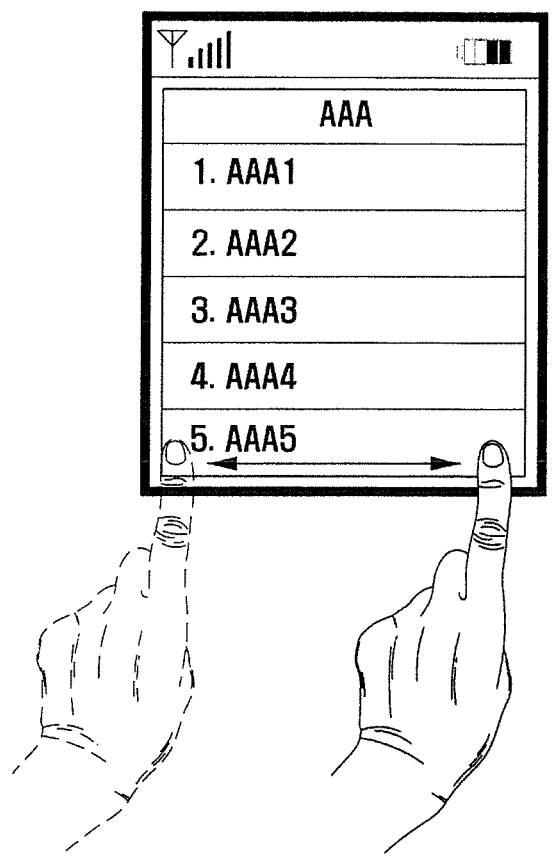
Figure 5C:
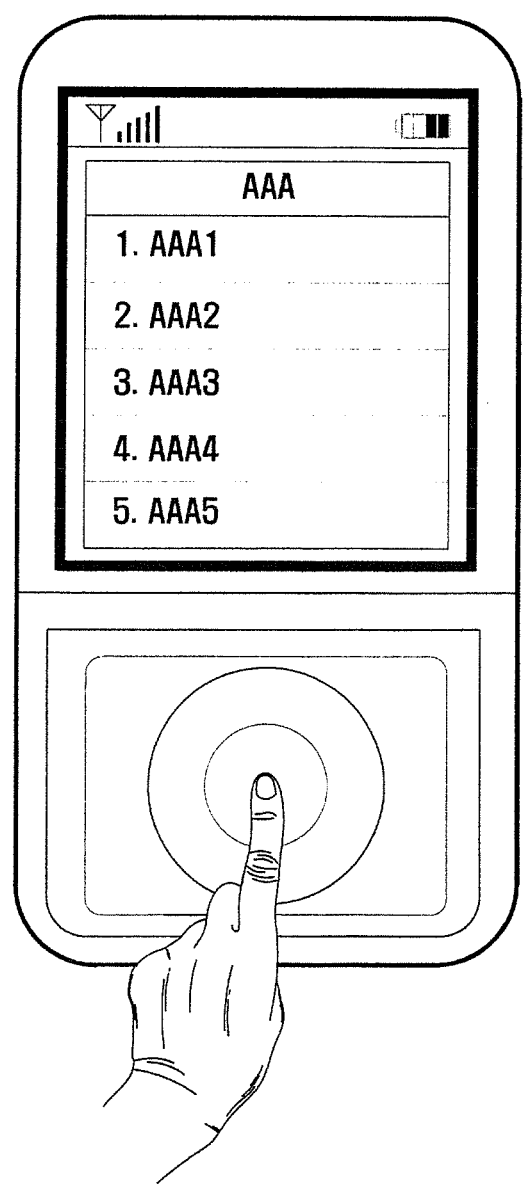

FIGS. 5A to 5C illustrate window manipulation by a user for content window display.

As illustrated in FIG. 5A, if a motion sensor is equipped, the control unit 107 can recognize shaking of the mobile terminal by the user as a multi-window display request. As illustrated in FIG. 5B, if the display unit 109 has a touch-screen capability, the control unit 107 can recognize dragging on the lower end of the display unit 109 as a multi-window display request. As illustrated in FIG. 5C, if a touch wheel or scroll wheel is equipped, the control unit 107 can recognize pressing of the wheel center as a multi-window display request.

If a multi-window display request is input from the user, the control unit 107 displays contents windows associated with those contents at the same level as the currently selected content according to user settings (S205).

FIGS. 6A to 6D are screen representations illustrating various forms of content window display. FIGS. 7A to 7E are additional screen representations illustrating various forms of content window display.

Referring to FIGS. 6A to 6D, same-level content windows AAA, BBB, CCC and DDD (corresponding to artists) are displayed, and their lower-level items AAA1, AAA2, AAA3, AAA4, AAA5 and the like (corresponding to songs) are also displayed.

Figure 6A:
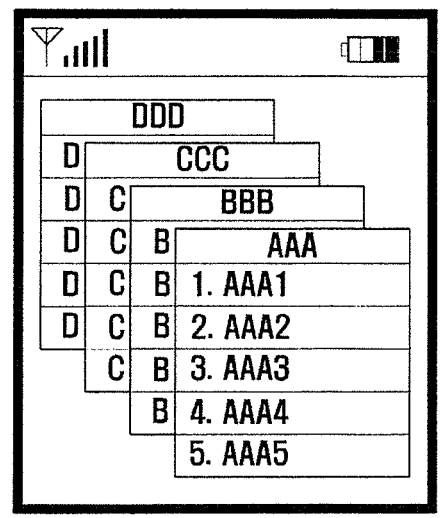
FIGS. 6A to 6D are screen representations illustrating various forms of content window display.
Figure 6B:
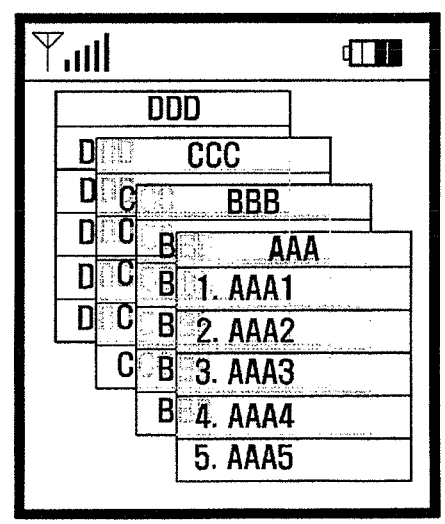
Figures 6C, 6D:
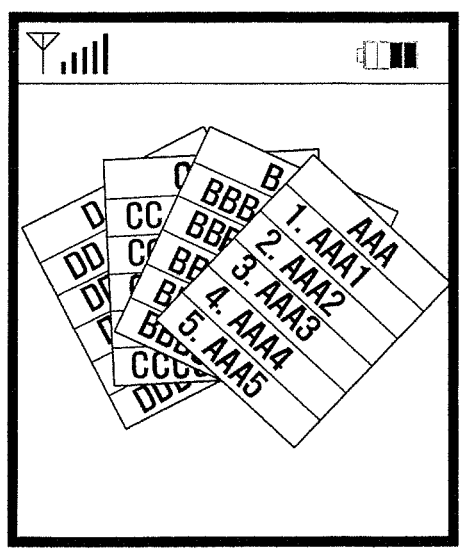

In response to input of the multi-window display request, the control unit 107 can display the same-level content windows in the form of an opaque stack (FIG. 6A), in the form of a transparent stack (FIG. 6B), in the form of a tile board (FIG. 6C), or in the form of a folding fan (FIG. 6D). In FIGS. 6A and 6B, the windows overlap each other. However, content windows may be displayed in other forms. For example, odd numbered windows are stacked together and the remaining windows are not stacked. In FIG. 6C, content windows do not overlap each other, and the user can readily distinguish the windows. In display of same-level content windows, abridged content information is displayed in the windows other than the front window.

Referring to FIGS. 7A to 7E, same-level content windows AAA, BBB, CCC and DDD (corresponding to artists) are displayed, and their descriptive listings such as categories, album images and songs are also displayed.

Figure 7A:
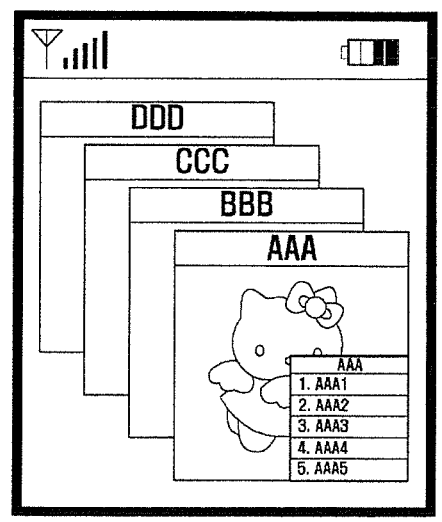
FIGS. 7A to 7E are additional screen representations illustrating various forms of content window display.
Figure 7B:
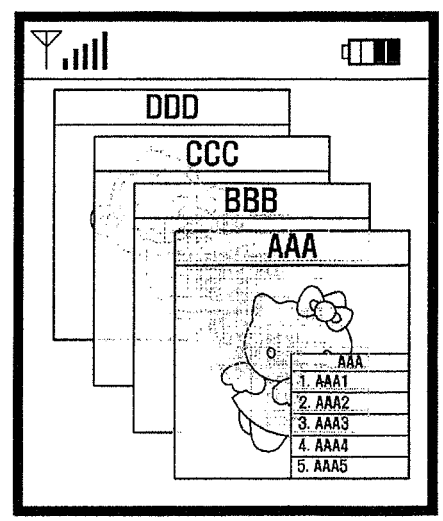
Figure 7C:
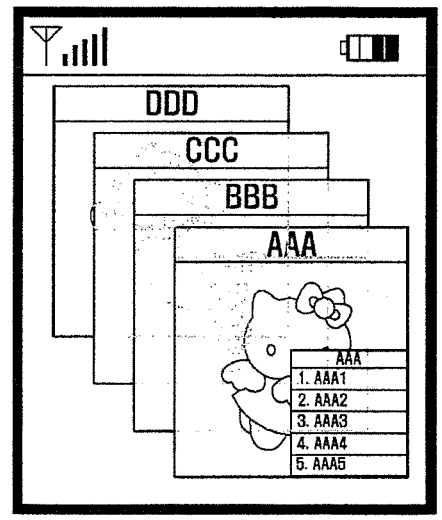
Figure 7D:
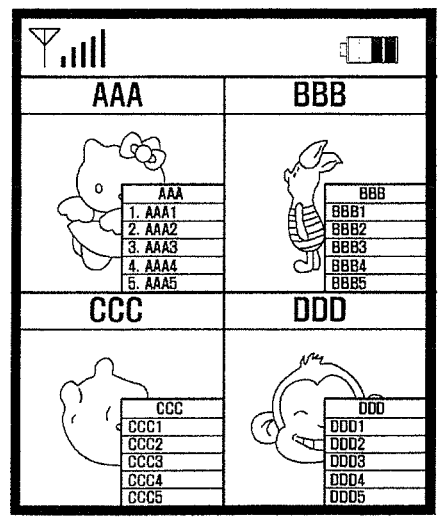
Figure 7E:
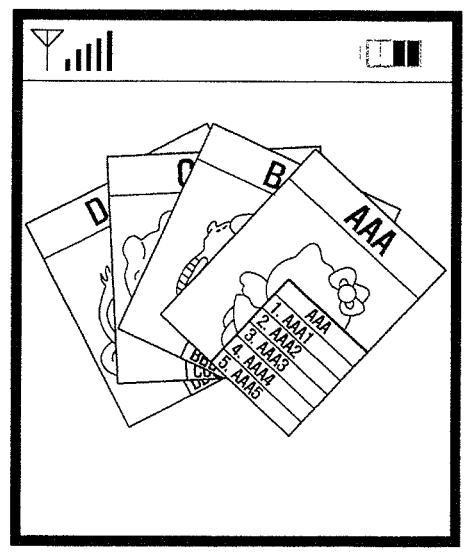

In response to input of the multi-window display request, the control unit 107 can display the same-level content windows in the form of an opaque stack (FIG. 7A), in the form of a transparent stack (FIG. 7B or FIG. 7C), in the form of a tile board (FIG. 7D), or in the form of a folding fan (FIG. 7E). In FIG. 7B, each content window includes an associated descriptive listing. In FIG. 7C, only the active content window (front window) includes an associated descriptive listing.

The control unit 107 checks whether a single window movement request is input from the user during display of multiple content windows (S207).

FIGS. 8A to 8E illustrate manipulation of content windows for single window movement.

Figure 8A:
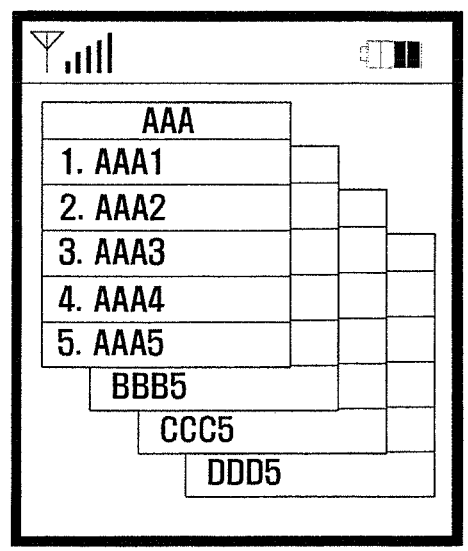
FIGS. 8A to 8E illustrate manipulation of content windows for single window movement.

During display of multiple content windows in the form of, for example, an opaque stack as in FIG. 8A, the control unit 107 detects input of a single window movement request.

Figure 8B:
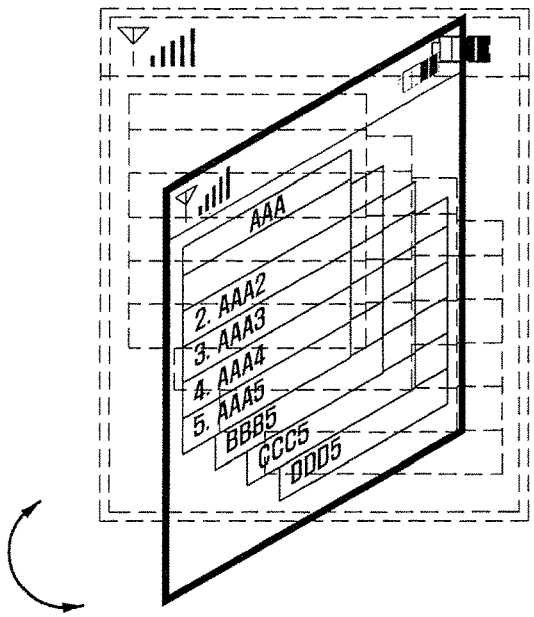
Figure 8C:
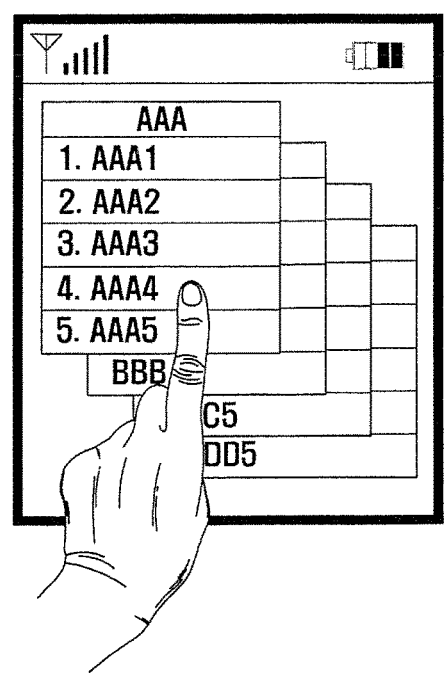
Figure 8D:
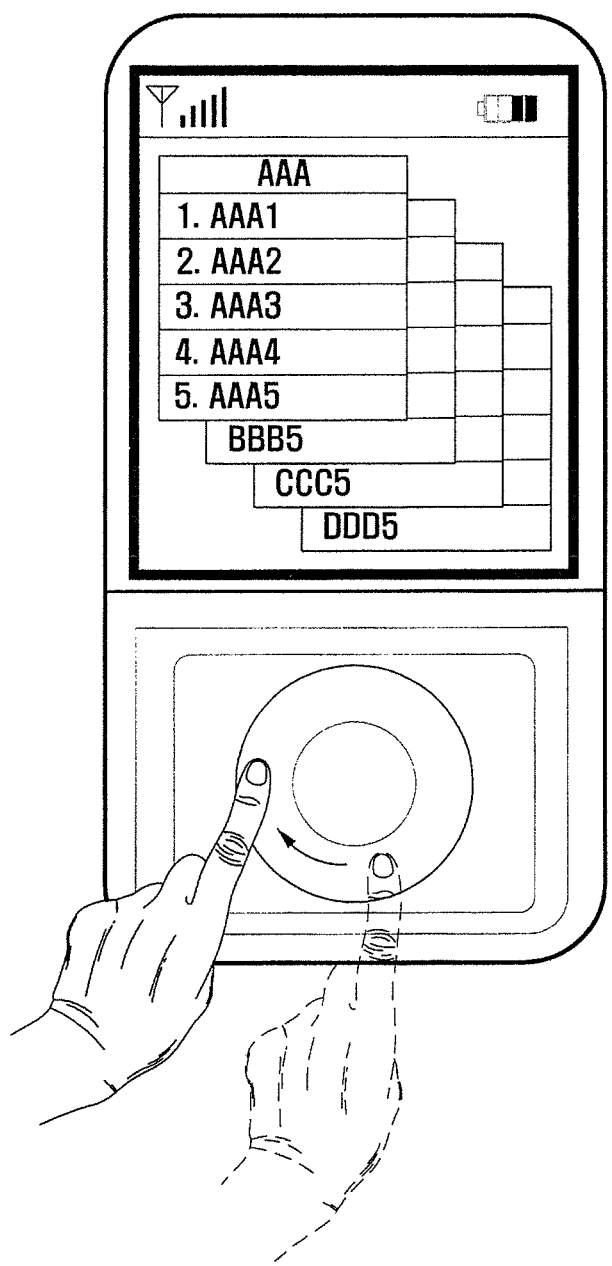

As illustrated in FIG. 8B, if a motion sensor is equipped, the control unit 107 can recognize turning of the mobile terminal perpendicularly to the ground as a single window movement request. As illustrated in FIG. 8C, if the display unit 109 has a touch-screen capability, the control unit 107 can recognize touching of a window to be moved (for example, the front window) on the display unit 109 as a single window movement request. As illustrated in FIG. 8D, if a touch wheel or scroll wheel is equipped, the control unit 107 can recognize a small amount of wheel rotation as a single window movement request.

Figure 8E:
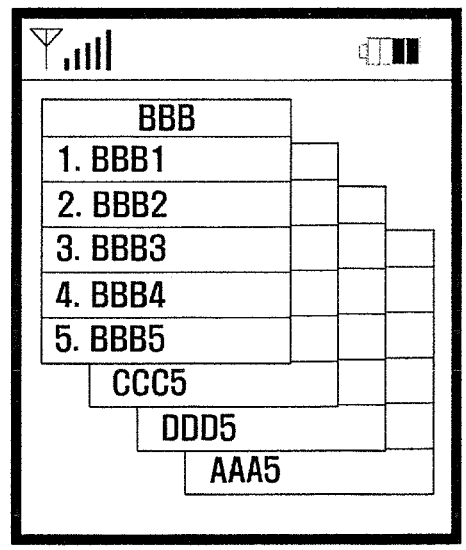

In response to input of a single window movement request, the control unit 107 performs a window movement operation (S209). The control unit 107 rearranges the content windows so that the front content window becomes the last window and the second content window becomes a new front window, as illustrated in FIG. 8E. Arrangement of content windows after performance of a window movement operation may differ depending upon the window arrangement prior to performance of the window movement operation.

The control unit 107 checks whether a multiple window movement request is input from the user during display of multiple content windows (S211).

FIGS. 9A to 9E illustrate manipulation of content windows for multiple window movement.

Figure 9A:
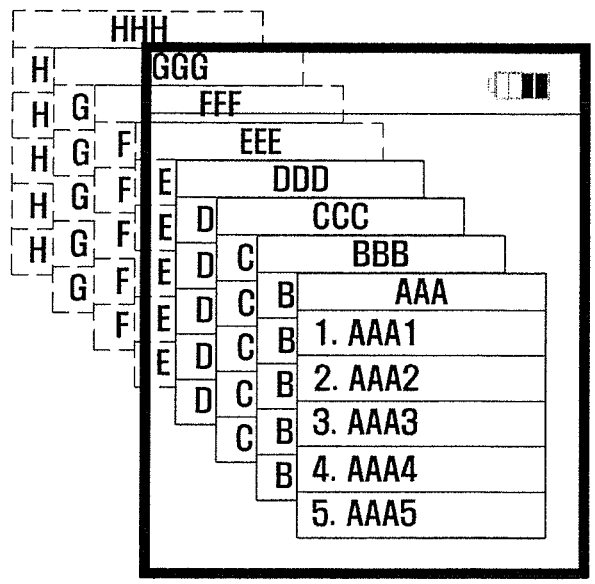
FIGS. 9A to 9E illustrate manipulation of content windows for multiple window movement.
Figure 9B:
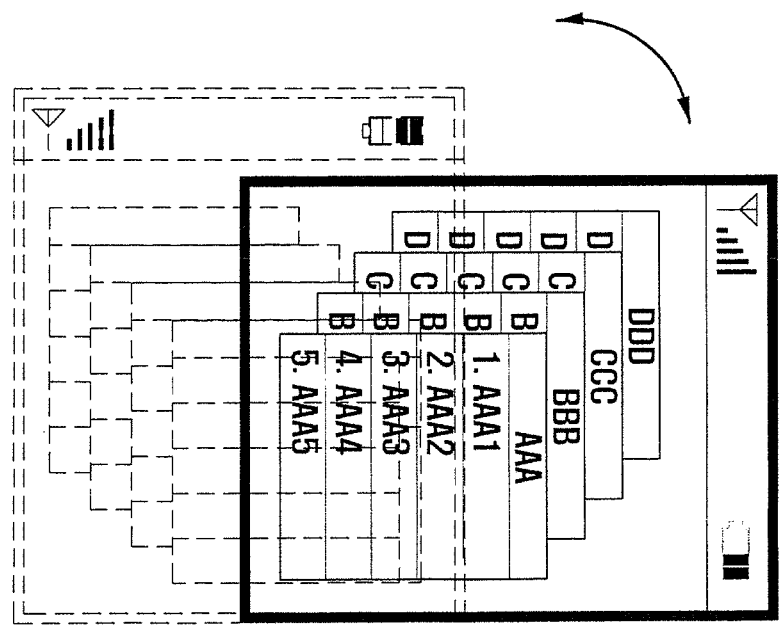
Figure 9C:
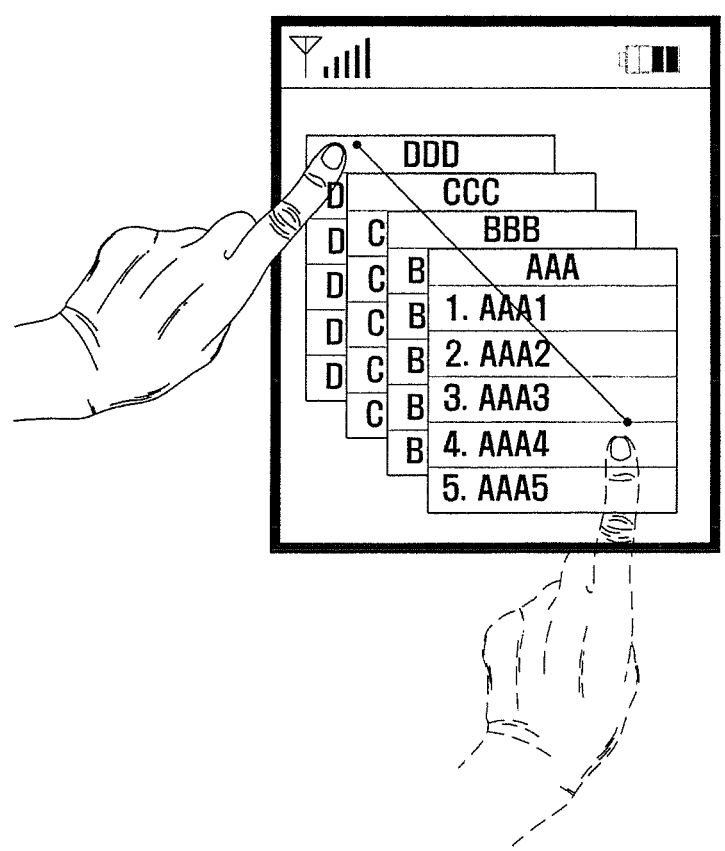
Figure 9D:
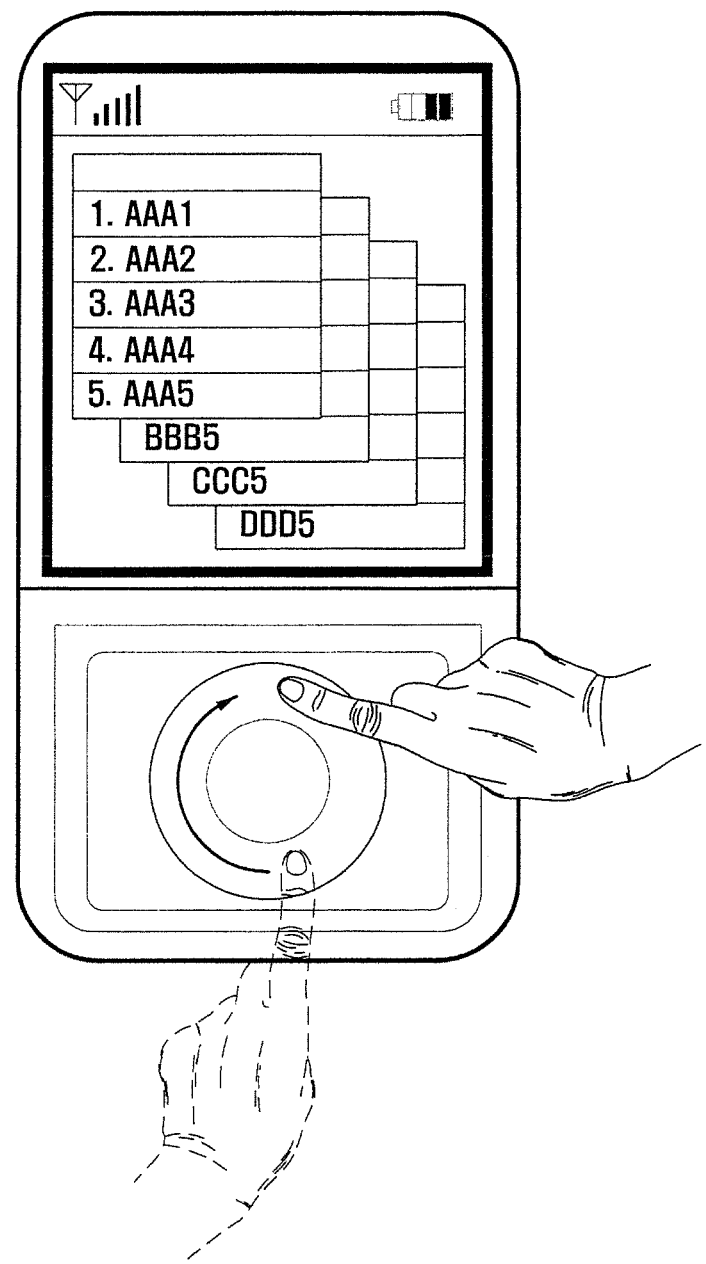

During display of multiple content windows as in FIG. 9A, the control unit 107 detects input of a multiple window movement request. As illustrated in FIG. 9B, if a motion sensor is equipped, the control unit 107 can recognize turning of the mobile terminal parallel with the ground as a multiple window movement request. As illustrated in FIG. 9C, if the display unit 109 has a touch-screen capability, the control unit 107 can recognize dragging from the front window to the last window on the display unit 109 as a multiple window movement request. As illustrated in FIG. 9D, if a touch wheel or scroll wheel is equipped, the control unit 107 can recognize a large amount of wheel rotation as a multiple window movement request.

Figure 9E:
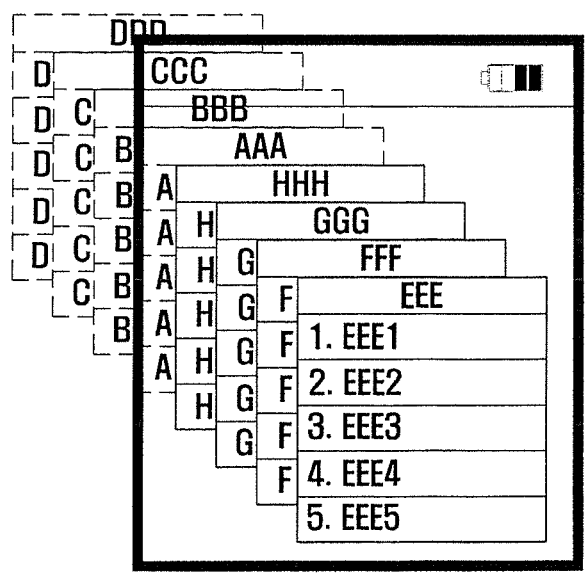

In response to input of a multiple window movement request, the control unit 107 performs a multiple window movement operation (S213). The control unit 107 rearranges content windows so that the content windows in display become invisible and content windows not in display become visible on the display unit 109, as illustrated in FIG. 9E.

The control unit 107 checks whether a scrolling request is input from the user during display of multiple content windows (S215).

Figure 10A:
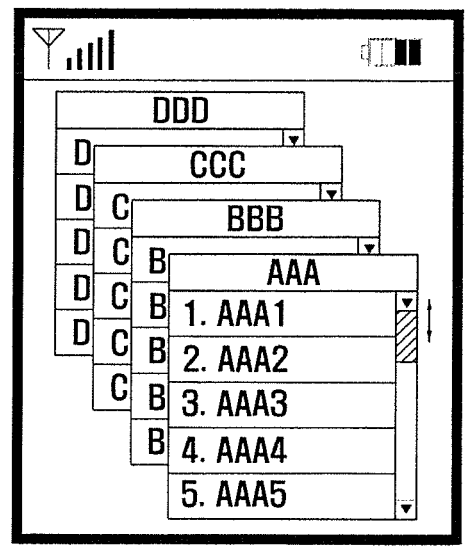
FIGS. 10A and 10B illustrate manipulation of content windows for scrolling.
Figure 10B:
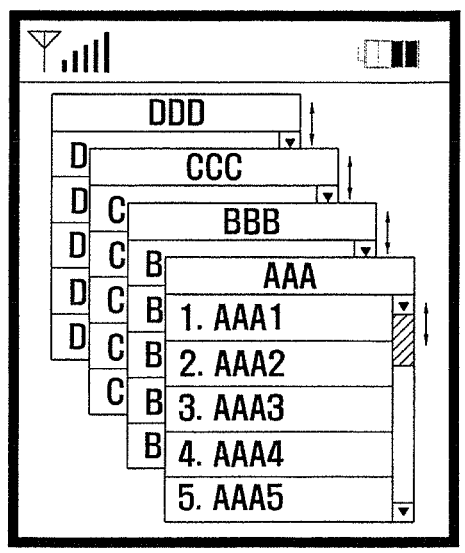

FIGS. 10A and 10B illustrate manipulation of content windows for scrolling.

During display of multiple content windows, the control unit 107 detects input of a scrolling request. If the display unit 109 has a touch-screen capability, the control unit 107 can recognize touching or dragging of the scroll bar as a scrolling request.

If a scrolling request is input, the control unit 107 performs a scrolling operation according to preset settings (S217). The control unit 107 can scroll the front content window as illustrated in FIG. 10A, or scroll all content windows in display as illustrated in FIG. 10B. Scrolling operations can be performed in other manners.

If a request other than a window manipulation request is input, the control unit 107 performs a requested function (S221).

The control unit 107 checks whether a termination request is input (S219). If a termination request is input, the control unit 107 finishes the process. Otherwise, the control unit 107 returns to step S203 for further processing.

Detection and processing of requests for multi-window display, single window movement, multiple window movement, and scrolling may also be performed in other manners.

In the present embodiment, the description is focused on music contents. The present method can also be applied to other types of contents. For example, photographs can be arranged using a hierarchical structure. In response to a multi-window display request during display of a photograph taken at a particular date, a list of same-level photographs taken at different dates can be displayed as content windows. The front (active) window can include thumbnail images representing photographs and titles of the photographs. The remaining windows can be arranged in the form of a stack so as to include partial or whole descriptive listings associated with photographs.

In the content display method of the present embodiment using a hierarchical structure of contents, same-level contents are displayed together on a single screen according to a user request. Hence, the user can readily transition between contents (select a different content), enhancing user convenience.

Next, another exemplary embodiment of the present invention is described. Descriptions of elements and steps identical to or corresponding to those in FIG. 2 are omitted.

An application display method of the present embodiment is similar to the content display method of FIG. 2, but differs in that in response to a multi-window display request during execution of multiple applications, windows associated with the multiple applications in execution are displayed together on a single screen.

Referring to FIG. 1, the memory unit 101 stores various applications. In response to a multi-window display request by the user when multiple applications are in execution and an application is selected for display, the memory unit 101 arranges the applications in execution in the form of an opaque stack, transparent stack, tile board, or folding fan, and temporarily stores the arranged applications.

When multiple applications are in execution and an application is selected for display, the control unit 107 rearranges application windows in response to requests for multi-window display, single window movement, multiple window movement, and scrolling.

The display unit 109 displays multiple selected applications, and an active application window. When multiple applications are in execution and an application is selected for display, the display unit 109 displays application windows rearranged according to preset settings in response to requests for multi-window display, single window movement, multiple window movement, and scrolling.

Figure 11:
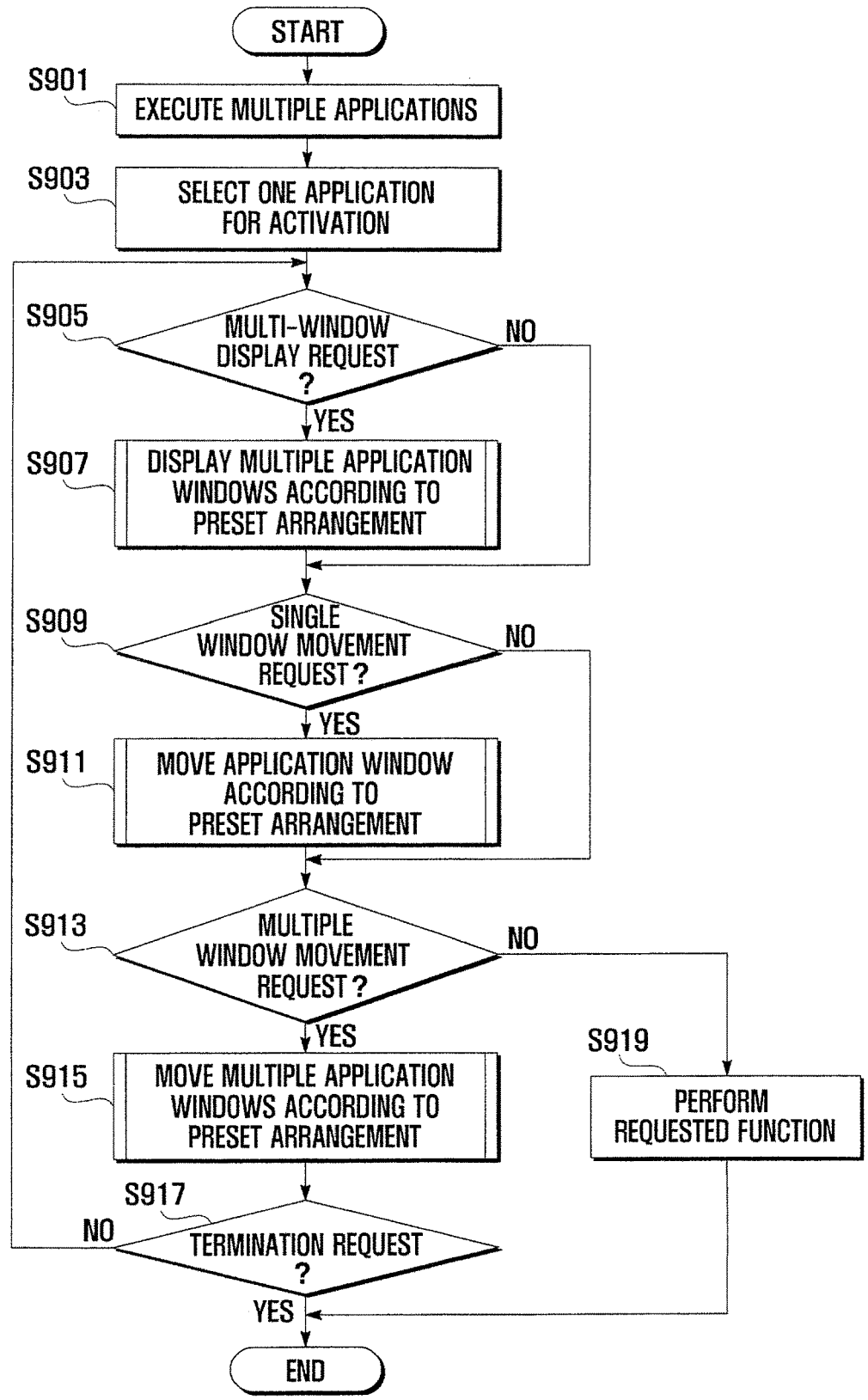
FIG. 11 is a flow chart illustrating an application display method according to another exemplary embodiment of the present invention.

FIG. 11 is a flow chart illustrating an application display method according to another exemplary embodiment of the present invention. The application display method includes steps similar to those of the content display method in FIG. 2.

Referring to FIG. 11, the control unit 107 executes multiple applications selected by the user (S901). The user can direct the control unit 107 to execute multiple stored applications if necessary.

The control unit 107 activates, upon selection of one of the applications in execution by the user, the selected application (S903). The window associated with the activated application is displayed on the display unit 109.

When multiple applications are in execution and an application is selected for display, the control unit 107 checks whether a multi-window display request is input by the user (S905). Recognition of a multi-window display request is described in connection with FIG. 2.

If a multi-window display request is input, the control unit 107 displays multiple application windows according to preset settings (S907). Arrangement of multiple windows is described in connection with FIG. 2.

During display of the multiple application windows, the control unit 107 checks whether a single window movement request is input from the user (S909). Recognition of a single window movement request is described in connection with FIG. 2.

If a single window movement request is input, the control unit 107 moves the application windows according to preset settings (S911). Processing of single window movement is described in connection with FIG. 2.

During display of the multiple application windows, the control unit 107 checks whether a multiple window movement request is input from the user (S913). Recognition of a multiple window movement request is described in connection with FIG. 2.

If a multiple window movement request is input, the control unit 107 moves multiple application windows according to preset settings (S915). Processing of multiple window movement is described in connection with FIG. 2.

If a request other than a window manipulation request is input, the control unit 107 performs a requested function (S919).

The control unit 107 checks whether a termination request is input (S917). If a termination request is input, the control unit 107 finishes the process. Otherwise, the control unit 107 returns to step S905 for further processing.

The application display method may further include a step for scrolling.

As apparent from the above description, the present invention provides a screen display method for a mobile terminal wherein same-level contents or application windows in execution can be displayed together on a single screen according to a user request. Hence, the user can readily transition between contents or applications with enhanced user convenience.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
presenting, via a screen operatively coupled to a mobile terminal, a first window associated with a first multimedia content,
the first window displayed at a first screen size,
the first window having been selected for presentation, and
the first window including, in a portion of the first window, a display associated with a first sub-multimedia content, the first sub-multimedia content corresponding to the first multimedia content;
identifying an input requesting a multi-window display including the first window and a second window while the first window is presented; and
responsive to the identified input, presenting the multi-window display on the screen, presenting the multi-window display comprising:
automatically reducing the first window from the first screen size to a second screen size and presenting the first window in an area of the screen at the second screen size,
presenting the second window in another area of the screen, the second window including, in a portion of the second window, a display associated with a second sub-multimedia content, the second sub-multimedia content corresponding to a second multimedia content, and
abridging an amount of information to be presented in the second window based at least in part on determining that an item of the second multimedia content in the second window is inactivated, wherein abridging the amount of information to be presented in the second window comprises omitting an amount of information to be presented in the second window and not occluded by the first window.

2. The method of claim 1, wherein the presenting of the multi-window display further comprises:
presenting the second window at a same screen size as the first window; and
presenting the display associated with the second sub-multimedia content at a same screen size as the display associated with the first sub-multimedia content.

3. The method of claim 1, wherein the presenting the multi-window display comprises:
hiding a display associated with a sub-multimedia content view based at least in part on a determination that multimedia content in the same window as the display associated with the sub-multimedia content view is inactivated.

4. The method of claim 1, wherein the first multimedia content corresponds to a first time in a first time range and the second multimedia content corresponds to a second time in a second time range.

5. The method of claim 4, wherein the presenting of the multi-window display comprises:
presenting a first image captured during the first time range as the display associated with the first sub-multimedia content, and a second image captured during the second time range as the display associated with the second sub-multimedia content.

6. The method of claim 1, wherein the presenting of the multi-window display comprises:

enabling a selection of the second sub-multimedia content from the multi-window display.

7. The method of claim 1, wherein the presenting of the multi-window display comprises:
rearranging at least one of the first window or the second window.

8. The method of claim 7, further comprising:
presenting a third window, the third window associated with a third multimedia content, the third window including, in a portion of third window, a display associated with a third sub-multimedia content; and
based at least in part on the presenting of the third window, hiding at least one of the first or second windows.

9. An apparatus comprising:
a screen; and
a controller configured to:
present, via the screen, a first window associated with a first multimedia content, wherein the first window is displayed at a first screen size,
wherein the first window is selected for presentation, and
wherein the first window includes, in a portion of the first window, a display associated with a first sub-multimedia content, the first sub-multimedia content corresponding the first multimedia content;
identify an input requesting a multi-window display including the first window and a second window while the first window is presented; and
responsive to the identified input, present the multi-window display on the screen, presenting the multi-window display comprising:
automatically reducing the first window from the first screen size to a second screen size and presenting the first window in an area of the screen at the second screen size,
presenting the second window in another area of the screen, the second window including, in a portion of the second window, a display associated with a second sub-multimedia content, the second sub-multimedia content corresponding to a second multimedia content, and
abridging an amount of information to be presented in the second window based at least in part on determining that an item of the second multimedia content in the second window is inactivated, wherein abridging the amount of information to be presented in the second window comprises omitting an amount of information to be presented in the second window and not occluded by the first window.

10. The apparatus of claim 9, further comprising a motion sensor, wherein the controller is configured to:
identify an output from the motion sensor in response to a motion of the apparatus as at least part of the input.

11. The apparatus of claim 9, wherein at least one of the first multimedia content or the second multimedia content is presented as a three dimensional image.

12. The apparatus of claim 9, wherein the first and second multimedia contents occupy a same level in a hierarchical structure.

13. The apparatus of claim 9, wherein the controller is configured to:
enable selection of the second sub-multimedia content from the multi-window display.

14. The apparatus of claim 9, wherein the first multimedia content comprises a first document and the second multimedia content comprises a second document, wherein the first sub-multimedia content comprises a first set of pages corresponding to the first document and the second sub-multimedia content comprises a second set of pages corresponding to the second document.

15. The apparatus of claim 9, wherein the first multimedia content comprises a first image corresponding to a first application, and the second multimedia content comprises a second image corresponding to a second application, wherein the controller is configured to:
receive a second input via a user inter action with the display associated with the first sub-multimedia content or the display associated with the second sub-multimedia content, the input causing the apparatus to perform at least one function of the first application or the second application.

16. The apparatus of claim 9, wherein the first multimedia content or the second multimedia content comprises information associated with at least one of a music file, an image, a moving image, an application, a document, or a data file.

17. The apparatus of claim 9, wherein the controller is configured to:
scroll the first or second window to present a display associated with a third sub-multimedia content, the display associated with the third sub-multimedia content being previously hidden from view.

18. A non-transitory machine-readable storage device storing instructions that, when executed by a processor, cause the processor to perform operations comprising:
presenting, via a screen operatively coupled to a mobile terminal, a first window associated with a first multimedia content,
the first window displayed at a first screen size,
the first window having been selected for presentation, and
the first window including, in a portion of the first window, a display associated with a first sub-multimedia content, the first sub-multimedia content corresponding to the first multimedia content;
identifying an input requesting a multi-window display including the first window and a second window while the first window is presented; and
responsive to the identified input, presenting the multi-window display on the screen, presenting the multi-window display comprising:
automatically reducing the first window from the first screen size to a second screen size
and presenting the first window in an area of the screen at the second screen size,
presenting the second window in another area of the screen, the second window including, in a portion of the second window, a display associated with a second sub-multimedia content, the second sub-multimedia content corresponding to a second multimedia content, and
abridging an amount of information to be presented in the second window based at least in part on determining that an item of the second multimedia content in the second window is inactivated, wherein abridging the amount of information to be presented in the second window comprises omitting an amount of information to be presented in the second window and not occluded by the first window.

* * * * *